United States Patent
Groer et al.

(10) Patent No.: US 7,664,595 B2
(45) Date of Patent: Feb. 16, 2010

(54) FAULT CODE MEMORY MANAGER ARCHITECTURE CONCEPT CONSISTING OF A DEDICATED MONITORING UNIT MODULE AND A FAULT MEMORY MANAGER ADMINISTRATOR MODULE FOR HEAVY DUTY DIESEL ENGINE

(75) Inventors: Frank Steffen Groer, Stuttgart (DE); Tomislav Ivo Golub, Birmingham, MI (US)

(73) Assignee: Detroit Diesel Corporation, Detroit, MI (US)

( * ) Notice: Subject to any disclaimer, the term of this patent is extended or adjusted under 35 U.S.C. 154(b) by 229 days.

(21) Appl. No.: 11/938,967

(22) Filed: Nov. 13, 2007

(65) Prior Publication Data
US 2008/0162023 A1  Jul. 3, 2008

Related U.S. Application Data

(60) Provisional application No. 60/877,989, filed on Dec. 29, 2006.

(51) Int. Cl.
*G06F 19/00* (2006.01)
(52) U.S. Cl. .................. 701/114; 701/35; 701/103; 701/115; 702/183

(58) Field of Classification Search ............ 701/29, 701/31, 33, 35, 101–103, 111, 114, 115; 702/182–187
See application file for complete search history.

(56) References Cited

U.S. PATENT DOCUMENTS

| | | | |
|---|---|---|---|
| 4,527,251 A * | 7/1985 | Nibby et al. | 714/8 |
| 5,021,764 A | 6/1991 | Mabee | |
| 5,668,726 A * | 9/1997 | Kondo et al. | 701/115 |
| 6,181,992 B1 | 1/2001 | Gurne et al. | |
| 6,324,659 B1 | 11/2001 | Pierro | |
| 6,895,326 B1 * | 5/2005 | Rollinger et al. | 701/110 |
| 6,975,936 B2 | 12/2005 | Akuzawa et al. | |
| 7,117,079 B2 | 10/2006 | Streichsbier et al. | |
| 7,130,768 B2 | 10/2006 | Hofmeister et al. | |
| RE39,619 E | 5/2007 | Andreasen et al. | |
| 2008/0162025 A1 * | 7/2008 | Groer et al. | 701/115 |

FOREIGN PATENT DOCUMENTS

| | | | | |
|---|---|---|---|---|
| JP | 2002106411 A * | 4/2002 | | 701/114 |
| JP | 2002106412 A * | 4/2002 | | 701/114 |

* cited by examiner

*Primary Examiner*—Willis R Wolfe, Jr.
(74) *Attorney, Agent, or Firm*—Bill C. Panagos; Rader, Fishman & Grauer, PLLC

(57) ABSTRACT

A fault code memory manager architecture for heavy duty diesel engines consisting of a dedicated monitoring unit module and at least one fault code memory manager administrator module.

8 Claims, 3 Drawing Sheets

FAULT CODE MEMORY MANAGER ARCHITECTURE CONCEPT CONSISTING OF A DEDICATED MONITORING UNIT MODULE AND A FAULT MEMORY MANAGER ADMINISTRATOR MODULE FOR HEAVY DUTY DIESEL ENGINE

CROSS-REFERENCE TO RELATED APPLICATIONS

The present application claims priority to U.S. Provisional Application Ser. No. 60/877,989 filed Dec. 29, 2006, the contents of which is incorporated herein in its entirety.

BACKGROUND OF THE INVENTION

1. Field of the Invention

The present invention relates to a system and apparatus for controlling the operation of an electronic controlled internal combustion engine.

The present invention further relates to an electronic control unit having memory for an internal combustion engine comprised of a first module and a second module in electronic communication with each other and the engine.

The present invention further relates to a fault code memory manager architecture for heavy duty diesel engines consisting of a dedicated monitoring unit module and a fault code memory manager administrator module.

2. Detailed Description of the Related Art

Akuzawa, et al., U.S. Pat. No. 6,975,936 discloses a malfunction diagnosis system to aid a technician or engineer in diagnosing an internal combustion engine. The diagnostic system comprises an electronic control unit that is operatively coupled to a data storage device and to one or more engine sensors. The electronic control unit is configured to collect data from the one or more engine sensors, comparable collected data with predetermined engine parameter values, and storable collected and compared data in the data storage device in various formats. A computer is selectively coupled to the data storage device. The computer program is configured to display specific sets of data and to clearly display any faulty engine parameter values resulting from the collected data comparison.

Streichsbier, et al., U.S. Pat. No. 7,117,079 discloses an apparatus for performing simultaneous data monitoring, logging and controlling of the state of the system. The apparatus includes at lease one system sensor that provides a sensor data signal corresponding to a system characteristic of which the sensor is detecting, a memory that stores data and program instructions, at least one output port that provides an output signal to the system, and the microprocessor that receives the sensor data signal and executes the program instructions to monitor and log data corresponding to the data signal received from the system sensor and to provide system controlled data to the output port.

Hofmeister, et al., U.S. Pat. No. 7,130,768 discloses control systems for internal combustion engine. In such control systems, it is known that fault diagnoses are carried out to ensure the functional reliability of the internal combustion engine or the motor vehicle even in the event of a fault. If a fault symptom occurs, the cause of the fault is determined and a diagnosis manager is used as a rule to deactivate the defect control system completely or to initiate an emergency operation function. It is proposed that all information leading to fault symptoms should be listed, the actual cause should be determined by comparison with stored fault profiles and as a result only the smallest possible restriction of the functions of the relevant control systems should be initiated. This has the advantage that the control system can, as a rule, continue to be operated despite the restricted functional scope.

BRIEF SUMMARY OF THE INVENTION

In one aspect, the present invention is a system for controlling the operation of an electronic controlled internal combustion engine equipped with an Electronic Control Unit (ECU). The ECU is comprised of a programmable motor control module having engine operating instructions resident in memory. The motor control module (MCM) is in electronic communication with various engine systems to actuate said systems in accordance with engine operating instructions. The motor control module is further in electronic communication with at least one sensor to receive data signals indicative of engine operation fault conditions. The ECU further includes a Common Powertrain Controller (CPC2) in electronic communication with the motor control module. The Common Powertrain Controller has a fault code module resident therein. Fault codes from the motor control module are electronically communicated to the Common Powertrain Controller and stored in memory the fault code module (FCM) as a static record of motor control module fault code data. The static record provides data to update any replacement of the Common Powertrain Controller or the Motor Control Module.

Generally, the motor control module communicates to said Common Powertrain Controller on at least one of Controller Area network (CAN); Engine Controller Area Network (ECAN); SAE data link J1587; SAE data link J1939; uniform diagnostic system. The fault code module memory is electronically connected to a dedicated monitoring unit module and includes at least one field sufficient to describe fault behavior in at least one monitoring unit fault code identifier used internally between the Motor Control Module and the Common Powertrain Controller. The fault code module keeps a record of static motor control module fault code data in XFLASH memory. The Common Powertrain Controller echoes faults from the motor control module on SAE data links J1587 and J1939.

DETAILED DESCRIPTION OF THE INVENTION

Figure 1:
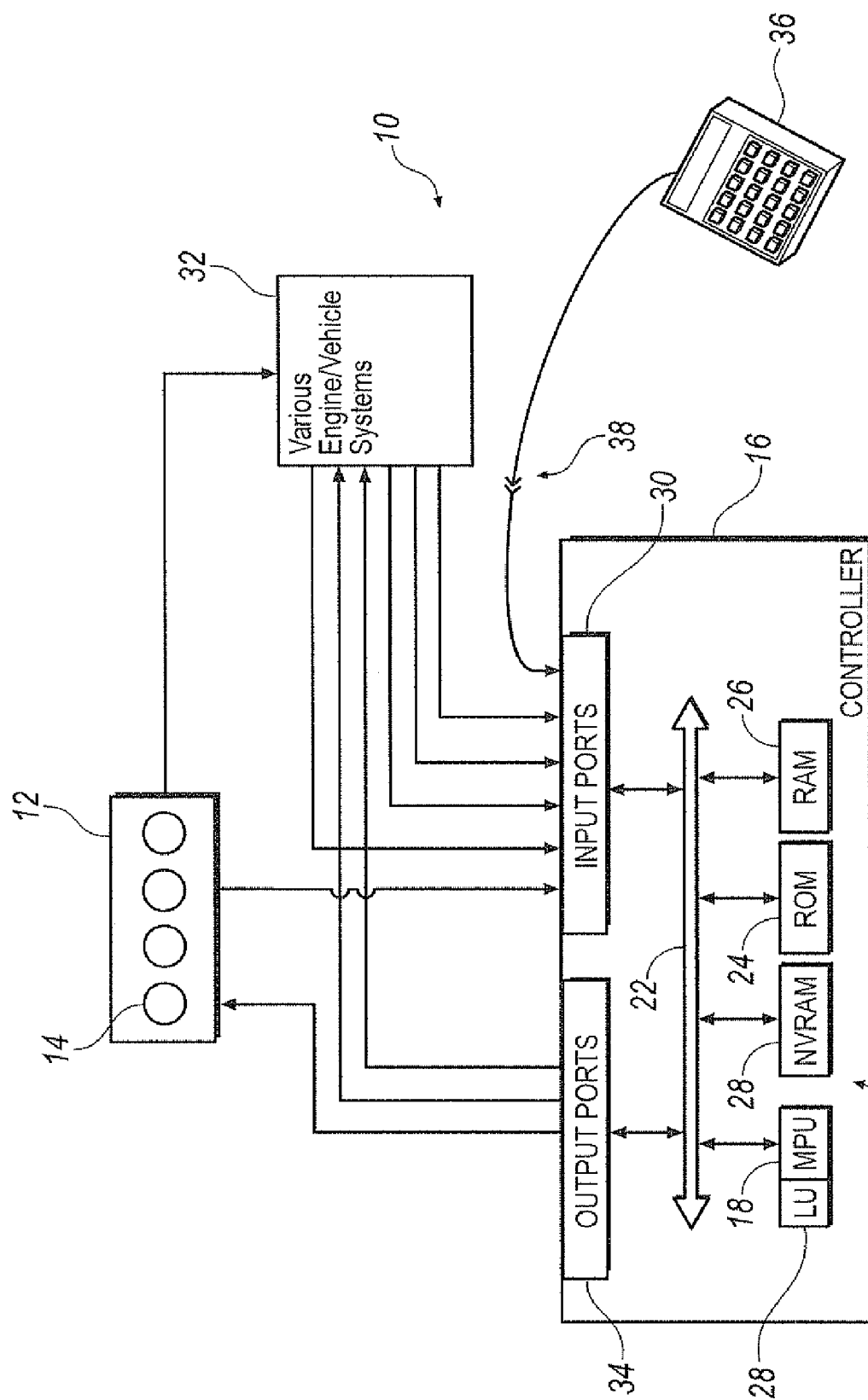
FIG. 1 is a schematic representation of an internal combustion engine, an electronic controller, and various systems.

Turning now to the drawings where like numerals depict like structures and particularly to FIG. 1, there is schematically represented a diagramatic view illustrating a compression-ignition internal combustion engine system 10 incorporating various features according to the present invention is shown. The engine 12 may be implemented in a wide variety of applications including on-highway trucks, construction equipment, marine vessels, stationary generators, pumping stations, and the like. The engine 12 generally includes a plurality of cylinders disposed below a corresponding cover, indicated generally by reference numeral 14.

In a preferred embodiment, the engine 12 is a multi-cylinder compression ignition internal combustion engine, such as a 3, 4, 6, 8, 12, 16, or 24 cylinder diesel engine. However, the engine 12 may be implemented having any appropriate number of cylinders 14, the cylinders having any appropriate displacement and compression ratio to meet the design criteria of a particular application. Moreover, the present invention is not limited to a particular type of engine or fuel. The present invention may be implemented in connection with any appropriate engine (e.g., Otto cycle, Rankin cycle, Miller cycle, etc.) using an appropriate fuel to meet the design criteria of a particular application.

A controller 16 preferably comprises a programmable microprocessor 18 in communication with (i.e., coupled to) various computer readable storage media 20 via at least one data and control bus 22. The computer readable storage media 20 may include any of a number of devices such as read only memory (ROM) 24, random access memory (RAM) 26, and non-volatile (keep-alive) random access memory (NVRAM) 28.

The various types of computer-readable storage media 20 generally provide short-term and long-term storage of data (e.g., at least one lookup table, LUT, at least one operation control routine, at least one mathematical model for EGR control, etc.) used by the controller 16 to control the engine 10. The computer-readable storage media 20 may be implemented by any of a number of known physical devices capable of storing data representing instructions executable by the microprocessor 18. Such devices may include PROM, EPROM, EEPROM, flash memory, and the like in addition to various magnetic, optical, and combination media capable of temporary and permanent data storage.

The computer-readable storage media 20 may include data representing program instructions (e.g., software), calibrations, routines, steps, methods, blocks, operations, operating variables, and the like used in connection with associated hardware to control the various systems and subsystems of the engine 10, and the vehicle. The computer readable storage media 20 generally have instructions stored thereon that may be executable by the controller 16 to control the internal combustion engine 10. The program instructions may direct the controller 16 to control the various systems and subsystems of the vehicle where the engine 12 is implemented, with the instructions being executed by microprocessor 20, and optionally, instructions may also be executed by any number of logic units 28. The input ports 30 may receive signals from the various engine and vehicle systems, including sensors and switches generally designated at 32, and the controller 16 may generate signals (e.g., the signals ACT and ADJ) at output ports 34. The output signals are generally presented (or transmitted) to the various vehicle components.

A data, diagnostics, and programming interface 36 may also be selectively connected to the controller 32 via a bus and connector 38 to exchange various information therebetween. The interface 36 may be used to change values within the computer readable storage media 20, such as configuration settings, calibration variables, and the like.

As used throughout the description of the present invention, at least one selectable (i.e., programmable, predetermined, modifiable, etc.) constant, limit, set of calibration instructions, calibration values (i.e., threshold, level, interval, value, amount, duration, etc.) or range of values may be selected by any of a number of individuals (i.e., users, operators, owners, drivers, etc.) via a programming device, such as the device 36 selectively connected via an appropriate plug or connector 38 to the controller 16.

Rather than being primarily controlled by software, the selectable or programmable constant and limit (or range) values may also be provided by an appropriate hardware circuit having various switches, dials, and the like. Alternatively, the selectable or programmable limit and range may also be changed using a combination of software and hardware without departing from the spirit of the present invention. However, the at least one selectable value or range may be predetermined and/or modified by any appropriate apparatus and method to meet the design criteria of a particular application. Any appropriate number and type of sensors, indicators, actuators, etc. may be implemented to meet the design criteria of a particular application.

In at least one mode of operation, the controller 16 may receive signals from the various vehicle sensors and switches, and execute control logic embedded in hardware and software to control the engine 12, various engine and vehicle systems 32, and the like. In one example, the controller 16 is implemented as at least one implementation of a DDEC controller available from Detroit Diesel Corporation, Detroit, Mich. Various other features of the DDEC controller are described in detail in a number of different U.S. patents assigned to Detroit Diesel Corporation. However, the present invention may be implemented in connection with any appropriate controller to meet the design criteria of a particular application.

Control logic may be implemented in hardware, firmware, software, or combinations thereof. Further, control logic may be executed by the controller 16, in addition to and by any of the various systems and subsystems of the vehicle or other installation where the controller 16 is implemented. Yet further, although in a preferred embodiment, the controller 16 includes the microprocessor 20, any of a number of known programming and processing techniques, algorithms, steps, bocks, processes, routines, strategies and the like may be implemented to control the engine 12, and the various engine and vehicle components 32. Further, the engine controller 16 may receive information in a variety of ways. For example, engine 12 systems information may be received over a data link, at a digital input, or at a sensor input of the engine controller 16.

Figure 2:
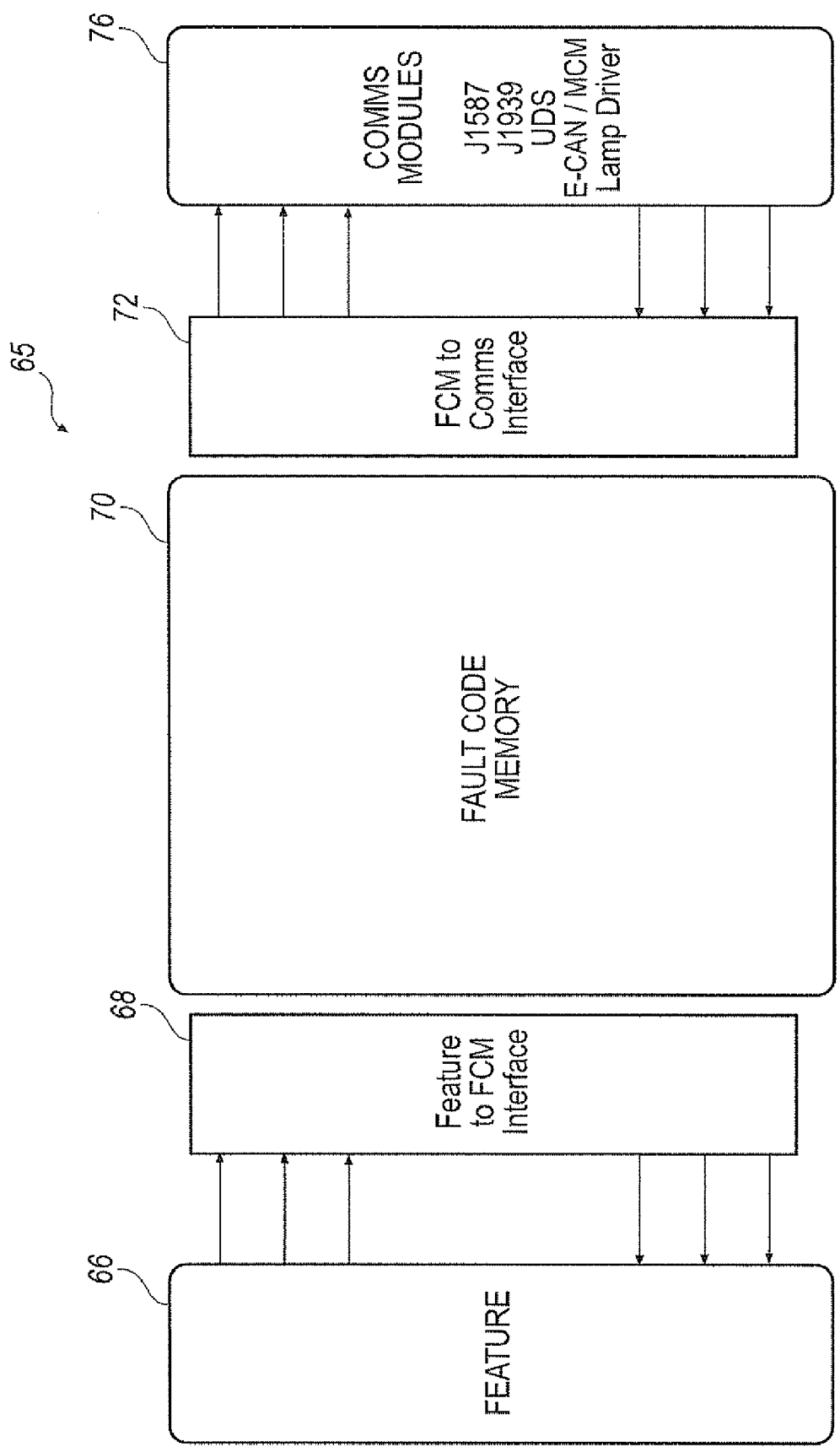
FIG. 2 is a is a schematic representation of an electronic controller depicting some of the internal organization.

FIG. 2 is a schematic representation of the controller 16 of the present invention. The controller has a Motor Control Module 40 and a Common Powertrain Controller 42. Each of the Common Powertrain Controller and the Motor Control Module has memory for storage and retrieval of operating software and faults. The Motor Control Module and the Common Powertrain Controller communicate with each other via the electronic controller area network (ECAN) 44. It is contemplated that any electronic communication between the Motor Control Module (MCM) and the Common Powertrain Controller is acceptable to communicate static faults stored in either, so that each has the most current version of the faults in the other module at any time. The Common Powertrain Controller communicates with the vehicle systems such as lamps and gauges 46, instrument cluster 48, tool/instrument 50. The CPC2 communicates with the instrument cluster and the tool/instrument via an SAE data link J1939 and J1587, (52 and 54, respectively). CPC2 outputs 56 are communicated t the lamps and gauges, and the CPC2 communicates with the diagnostic tool 36 over a UDS/CPC2 link 58. The CPC2 further acts as a gateway for the MCM to communicate with the diagnostic tool 36 over a UDS link/MCM 60 through the MCM gateway 62 in the CPC2. The MCM communicates to the gateway via a UDS CPC/MCM tunnel 64 and from there, communication is possible with the diagnostic tool.

Figure 3:
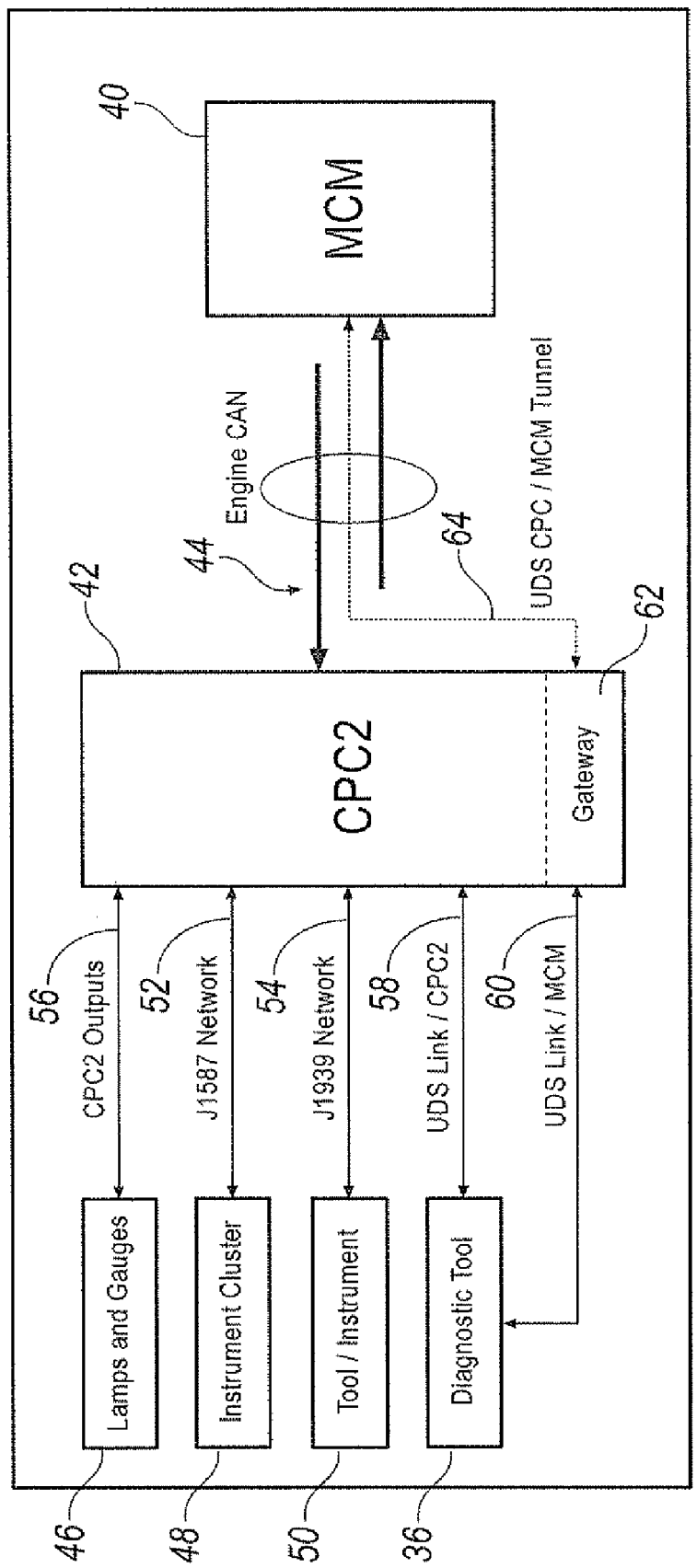
FIG. 3 is a schematic representation of a Fault Code Memory Module resident in a Common Powertrain Controller as described in FIG. 2.

FIG. 3 is a schematic representation of the fault code memory manager resident in the CPC2. A similar Fault Code Memory Manager Module may be resident in the MCM. The fault code memory manager tracks and stores faults in memory that are received by each MPU 18 (as seen in FIG. 1) and a system that the MPU is monitoring. Those skilled in the art will recognize that while only one MPU is schematically presented in FIG. 1, it is understood that multiple MPUs may be present, each MPU monitoring a different system of the vehicle or engine, such as EGR, Engine Speed, Engine Torque, Engine coolant temperature, Engine Boost Pressure, Engine Percent Load, Vehicle Speed as well as other engine operating systems and parameters.

The Fault Code Manager Administrator Module 65 interfaces to the individual features 66 through an interface 68 to evaluate conditions and periodically provide status of each individual fault condition. These fault conditions are indicated by fault condition status flags, and are then processed and debounced in the Fault Code Module 70 internal logic based upon a configurable set or other rules. Once the faults are logged, they are kept and maintained in memory in a fault table which can then sent out on all communication links through the communications link 72 to the modules such as the CPC2, or the MCM, or both, designated as 76. This communication may be is over J1587/J1939 SAE data links, or the ECAN, or a UDS link. Additional interfaces back to features and LGR module allows the engine system behavior to change depending on the active faults. The FCM system component may include any number of monitoring units (MU) and preferably, the CPC2 Fault Control Module contains approximately 200 CPC2 defined MUs and any number of monitoring units (MU) in the MCM, and preferably approximately 500 MCM defined MUs. The faults are debounced prior to being transmitted to ensure that each fault is indicative of current operating conditions, and not an error or an anomaly. The MCM debounced faults are updated once per second via the ECAN, and the CPC2 MUs are internally evaluated 10 times per second.

The system has a range of fault logging and handling capabilities, including at least one of Fault Identification, such as Monitoring Unit Identifier internally unique Fault Identifier, KWP path/type, Universal Diagnostic Service Identification, SPN (J1939 ID)/FMI, Flash code (lamp blink code) and fault name/description via a UDS tool, Environmental Conditions such as specified feature sponsor, exclusion conditions, Fault Debounce Timer types, such as none, or ramp/rest or integrating, debounce timers, such as debounce time (fault activation) recovery time (fault deactivation) healing time (inactive fault self deletion) lamp control for each MU, such as a buzzer, SEL, CEL, MIL, and Engine control, such as torque reduction and engine protection shutdown protection.

Low priority faults are not sent to the lamps over the communications links. Normally, these low priority faults are used in internal control logic but should not necessarily be shown to the vehicle operator. Preferably, lamp control on the dash board is handled separately and defined individually on per fault/per lamp basis. Preferably the system contemplates the following Communications Visibility Semaphore: Active Fault SENT, Inactive Fault Sent results in full visibility for a majority of faults. Active Fault NOT SENT, Inactive Fault SENT result sin fault which do not illuminate the lamps. Active Fault SENT, Inactive Fault NOT SENT results in no fault defined at the moment. Active Faults NOT SENT, Inactive Faults NOT SENT results in full invisibility of Faults, indicative of none for the moment.

The architecture of the present invention provides a snapshot of data record that includes, but is not limited to seconds active counter, seconds inactive counter, First Occurrence Date/Time Stamp (1 second), First Occurrence Engine Hour Stamp (1 second), Last Occurrence Date/Time Stamp (1 second) Last Occurrence Engine Hour Stamp (1 second) Engine and Vehicle Data, including engine RPM, engine torque, engine coolant temperature, engine boost pressure, engine percent load, vehicle speed, and number of SEO events. The present invention further indicates communications link failures, Fault code memory MCM link failure faults, Non volatile storage rated failures, such as checksum faults, Engine data Faults based upon the MCM warning level information, including oil level, oil pressure, coolant temperature, input/output related faults, such as analog inputs such as shorted or open circuit detection (both ground and battery), digital outputs such as open circuit, short to battery, short to ground, and rationality faults, such as the diesel particulate filer switch, and remote Power Take Off request switch.

While one aspect of the invention has been described, it is understood that the words used are words of description, and not words of limitation. Many variations and modifications are possible without departing from the scope and spirit of the invention as set forth in the appended claims.

What is claimed as new and desired to be protected by Letters Patent of the United States is:

1. A system for controlling the operation of an electronic controlled internal combustion engine equipped with an Electronic Control Unit (ECU);
    a programmable motor control module having engine operating instructions resident in memory; said motor control module in electronic communication with various engine systems to actuate said systems in accordance with said engine operating instructions; said motor control module further in electronic communication with at least one sensor to receive data signals indicative of engine operation fault conditions;
    a Common Powertrain Controller in electronic communication with said motor control module; said Common Powertrain Controller having at least one monitoring unit in electronic communication with an engine system and a fault code module resident therein; said fault codes from said motor control module electronically communicated to said common Powertrain controller and stored in memory said fault code module as a static record of motor control module fault code data; said static record to provide data to update any replacement of said common Powertrain controller or said motor control module.

2. The system of claim 1, wherein said fault code module memory is electronically connected to a dedicated monitoring unit module and includes at least one field sufficient to describe fault behavior in at least one monitoring unit fault code identifier used internally between said motor control module and said component powertrain controller.

3. The system of claim 1, wherein said fault code module keeps a record of static motor control module fault code data in XFLASH memory.

4. The system of claim 1, wherein faults in said CPC2 fault controller is internally evaluated a predetermined number of times in a predetermined period of time to ensure accuracy.

5. The system of claim 1, wherein said motor control module communicates to said Common Powertrain Controller an at least one of Common Area network (CAN); Engine Common Area Network (ECAN); SAE data link J1587; SAE data link J1939; uniform diagnostic system.

6. The system of claim 5, wherein said common powertrain controller echoes faults from said motor control module on SAE data links J1587 and J1939.

7. The system of claim 1, further including at least one monitoring unit in communication with at least one engine system and a fault control memory manager module in said MCM.

8. The system of claim 7, wherein said faults in said MCM fault control memory manager are evaluated a predetermined number of times in a predetermined period of time to ensure accuracy.

* * * * *